United States Patent Office 3,649,678
Patented Mar. 14, 1972

3,649,678
SUBSTITUTED CYCLOALKANE-ALKANOIC ACIDS
Raffaello Fusco, Milan, and Franco Tenconi, Monza, Italy, assignors to Warner-Lambert Company, Morris Plains, N.J.
No Drawing. Original application Apr. 24, 1964, Ser. No. 362,959, now Patent No. 3,439,099, dated Apr. 15, 1969. Divided and this application Jan. 9, 1969, Ser. No. 790,160
Int. Cl. C07c 65/14, 65/20
U.S. Cl. 260—501.16          10 Claims

ABSTRACT OF THE DISCLOSURE

There is described therapeutically active 1-benzyl- (or substituted benzyl-) substituted cycloalkanone alkanoic acids, 1-phenyl- (or substituted phenyl-) substituted cycloalkanol alkanoic acids and 1-benzyl- (or substituted benzyl-) cycloalkanol alkanoic acids. The compounds are useful, and are used, as choleretic agents.

CROSS REFERENCE TO RELATED APPLICATIONS

This application is a division of our pending U.S. patent application Ser. No. 362,959 filed Apr. 27, 1964, now U.S. Pat. No. 3,439,099, granted Apr. 15, 1969.

BRIEF DESCRIPTION OF THE INVENTION 1-benzyl- (or substituted benzyl-) substituted cycloalkanone alkanoic acids having the formula:

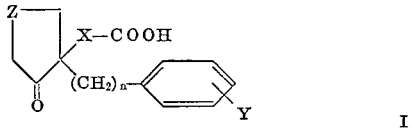
I wherein the symbol X represents an alkylene chain of from 1 to 4 carbon atoms, which optionally may be substituted by a lower alkyl group; wherein the symbol Y represents hydrogen, chlorine, fluorine or an alkoxy group containing from 1 to 3 carbon atoms; wherein the symbol Z represents a methylene or ethylene group; and wherein the symbol $n$ is the integer 1
and 1-phenyl- (or substituted phenyl-) substituted cycloalkanol alkanoic acids and 1-benzyl- (or substituted benzyl-) cycloalkanol alkanoic acids having the formula:

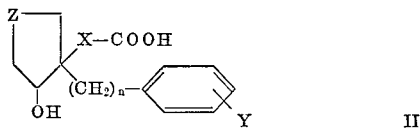
II wherein the symbols X, Y and Z have the same meaning as in Formula I and wherein the symbol $n$ represents 0 or the integer 1
are described.

The compounds of Formula I are produced by treating a compound having the formula:

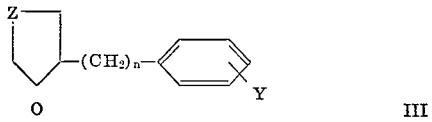
III wherein the symbols Y, Z and $n$ have the same meaning as in Formula I
with a cyanalkylating or carbalkoxy alkylating agent in the presence of a basic condensing agent and saponifying the resulting product in order to obtain the desired cycloalkanone alkanoic acid.

The compounds of Formula II are produced by treating the compound of Formula III wherein the symbols Y, Z and $n$ have the same meaning as in Formula II with a cyanalkylating or carbalkoxy alkylating agent in the presence of a basic condensing agent, saponifying the resulting product to obtain the corresponding cycloalkanone alkanoic acid and treating the acid, thus obtained, with a chemical reducing agent to convert the keto group to a hydroxy group.

The invention embraces also salts of the Formulas I and II compounds with pharmaceutically acceptable bases.

DETAILED DESCRIPTION

The present invention is concerned with certain therapeutically active alkanoic acids and with processes for their production. The compounds of the invention are characterized broadly as 1-benzyl- (or substituted benzyl-) substituted cycloalkanone alkanoic acids having the formula:

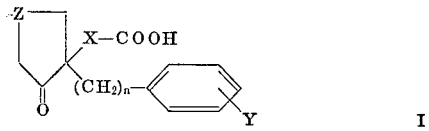
I wherein symbol X represents an alkylene chain of from 1 to 4 carbon atoms, which optionally may be substituted by a lower alkyl group; wherein symbol Y represents hydrogen, chlorine, fluorine or an alkoxy group containing from 1 to 3 carbon atoms in the carbon group; wherein the symbol Z represents a methylene or ethylene group; and wherein $n$ is the integer 1
and 1-phenyl- (or substituted phenyl-) substituted cycloalkanol alkanoic acids or 1-benzyl- (or substituted benzyl-) substituted cycloalkanol alkanoic acids having the formula:

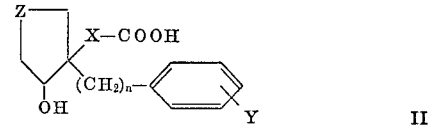
II wherein the symbols X, Y and Z have the same meaning as in Formula I and wherein the symbol $n$ represents 0 or the integer 1

The invention also encompasses salts of the compounds of Formulas I and II with therapeutically acceptable bases as well as non-toxic lower alkyl esters of the Formulas I and II acids. The salts of said carboxylic acids are advantageously those containing a pharmaceutically acceptable metal anion such as alkali metal or alkaline earth metal salts, for example, sodium, potassium, calcium and magnesium salts. Suitable salts are also those with organic bases, particularly amines, such as, mono- and di-lower alkylamines, for example, the salts with diethylamine.

Exemplary of the new cycloalkane substituted alkanoic acids of this invention are:

2-oxo-1-benzyl-cyclohexane propionic acid;
2-oxo-1-benzyl-cyclopentane propionic acid;
2-oxo-1-benzylcyclohexane-(β-methyl)-propionic acid;
2-oxo-1-(o-chlorobenzyl)-cyclohexane isobutryic acid;
2-oxo-1-(p-chlorobenzyl)-cyclopentane butyric acid;
2-oxo-1-benzyl-cyclohexane acetic acid;
2-oxo-1-benzyl-cyclohexane isobutyric acid;
2-oxo-1-benzyl-cyclohexane butyric acid;
2-hydroxy-1-phenyl-cyclopentane acetic acid;
2-hydroxy-1-benzyl-cyclopentane propionic acid;

2-hydroxy-1-phenylcyclohexane acetic acid;
2-hydroxy-1-benzyl-cyclohexane propionic acid;
2-hydroxy-1-(p-chlorobenzyl)-cyclopentane acetic acid;
2-hydroxy-1-(p-ethoxybenzyl)-cyclopentane acetic acid;
2-hydroxy-1-benzyl-cyclohexane isobutyric acid;
2-hydroxy-1-(o-methoxybenzyl)-cyclopentane propionic acid;
2-hydroxy-1-(o-chlorobenzyl)-cyclopentane propionic acid;
and the salts and esters thereof.

We have discovered that the 1-substituted cycloalkane alkanoic acids of this invention and salts and esters thereof possess useful choleretic properties. These compounds employed, in the novel compositions and administered as hereinafter outlined, are pure choleretic agents as they stimulate the flow of bile, increasing the liberation of both liquid and solid constituents without affecting their proportion.

The compounds of this invention show also the advantage of a sustained and prolonged choleretic action; they are non-toxic, non-cholecystokinetic and tolerance does not develop to these agents. A particularly pronounced choleretic activity is realized with certain new 1-substituted cycloalkane alkanoic acids coming within the broad definition given above, these compounds being: 2-oxo-1-benzyl-cyclohexane propionic acid; 2-oxo-1-(o-methoxybenzyl)-cyclohexane propionic acid; 2-hydroxy-1-phenyl-cyclohexane acetic acid; 2-hydroxy-1-phenyl-cyclopentane acetic acid; and salts and esters thereof. A preferred and advantageous compound is 2-oxo-1-benzyl-cyclohexane propionic acid or its sodium or diethylamine salt.

The compositions of this invention are in dosage unit form comprising a non-toxic pharmaceutical carrier and at least one cycloalkane-1-substituted alkanoic acid or salts or esters thereof.

The pharmaceutical carrier may be any acceptable, solid or liquid, diluent suitable for oral, parenteral or intraduodenal application, such as calcium or magnesium carbonate, lactose, maize, starch, magnesium stearate, talc sucrose, agar, sterile water, ethanol and ethylene or propylene glycol. Thus the compositions may be formulated according to the known art as tablets, pills, capsules, syrups, sterile solutions or suspensions or other dosage forms suitable for oral, parenteral or intraduodenal administration. Generally the compositions contain the active ingredient in an amount of from 10 to 300 mg. preferably from 30 to 100 mg. per dosage unit. The administration is advantageously in equal doses one or more times daily to give a daily dosage of from 30 to 900 mg. and preferably from 50 to 300 mg.

The compositions can also contain other therapeutic substances, for example, liver-protecting agents including vitamins of the B group, parasympatholytic agents and enzymes.

The compositions of this invention are useful in the treatment of functional liver insufficiency, chloecystitis, chlolangitis, biliary dyskinesia, acute and chronic hepathopathy, postoperative treatment and dyspepsia and constipation of biliary origin.

The 1-substituted cycloalkane-alkanoic acids of this invention are readily produced. Thus, for example, the compounds of Formula I are obtained by treating a compound having the formula:

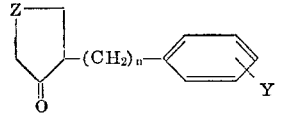

III wherein the symbols Y, Z and $n$ have the same meaning as in Formula I with a cyanalkylating agent or carbalkoxy-alkylating agent in the presence of a basic condensing agent and saponifying the resulting product in order to obtain the corresponding cycloalkanone-alkanoic acid. The compounds of Formula II are obtained by treating the compound of Formula III, wherein the symbols Y, Z and $n$ have the same meaning as in Formula II, with a cyanalkylating agent or a carbalkoxy-alkylating agent in the presence of a basic condensing agent, saponifying the resulting product in order to produce the corresponding cycloalkanone-alkanoic acid. By submitting the latter to treatment with a reducing agent according to known methods for converting a keto group to a hydroxy group, such as lithium aluminum hydride or sodium boro hydride, the corresponding cycloalkanol-alkanoic acid is prepared. Said carboxylic acid derivatives are converted to the corresponding salts by treatment with the appropriate organic or inorganic base, according to standard procedure for acid salt formation.

The invention is illustrated but not limited by the following examples.

Example 1

To a solution of 10 g. of α-(o-chlorobenzyl)-cyclohexanone in 80 cc. of dioxane and 1 cc. of benzyltrimethylammonium hydroxide there is added, under stirring at room temperature, a solution of 3.6 g. of acrylonitrile in 10 cc. of dioxane. After 2 hours at 45–50° C. the solvent is evaporated and the residue distilled under vacuum. The fraction collected at 165–168° C./0.2 mm. Hg yields 2-oxo-1-(o-chlorobenzyl)-cyclohexane propionitrile.

2 g. of nitrile are heated under reflux with 20 cc. of 20% aqueous potassium hydroxide solution until the evolution of ammonia ceases. After cooling, the reaction mixture is extracted with ether and the aqueous phase is acidified by addition of hydrochloric acid. The resulting mixture is extracted with ether and the ethereal phase is washed with water, dried over sodium sulfate and evaporated. The dense oily residue, after crystallization from anhydrous ligroin gives 2-oxo-1-(o-chlorobenzyl)-cyclohexane propionic acid. M.P. 106–108° C.

Example 2

By treating as in Example 1 a dioxane solution of 15 g. of acrylonitrile with 35 g. of α-benzyl-cyclohexanone in the presence of benzyltrimethylammonium hydroxide there is obtained 2-oxo-1-benzyl-cyclohexane propionitrile; B.P. 155–158° C./0.2 mm. Hg. This compound is heated to reflux with a mixture in equal parts of glacial acetic acid and concentrated hydrochloric acid for ten hours. The reaction mixture is then evaporated under vacuum and the residue dissolved in 10% aqueous sodium hydroxide solution.

After extraction with ether, the aqueous phase is acidified by addition of hydrochloric acid. The oily acid is extracted with ether and the ethereal extracts are washed with water, dried and evaporated to give 2-oxo-1-benzyl-cyclohexane propionic acid as raw material. The compound is purified by physical or chemical methods to give the pure product melting at 65–67° C.

To a solution of 2.6 g. of 2-oxo-1-benzylcyclohexane propionic acid in 10 cc. of anhydrous ether is added 1.1 g. of anhydrous diethylamine, to form the diethylamine salt of 2-oxo-1-benzyl-cyclohexane propionic acid. M.P. 71–72° C.

Example 3

A solution of 8.6 g. of methyl acrylate in 10 cc. of anhydrous dioxane is added dropwise with stirring to a mixture of 18.8 g. of α-benzyl-cyclohexanone, 100 cc. of anhydrous dioxane and 5 cc. of 40% methanolic benzyltrimethylammonium hydroxide solution. The reaction mixture is stirred for 4 hours, the solvent is then evaporated under vacuum at low temperature and the residue is distilled under vacuum to obtain methyl 2-oxo-1-benzyl-cyclohexane propionate as a colourless oil: B.P. 145–147° C./0.2 mm. Hg.

By substituting in the above reaction ethyl acrylate for methyl acrylate, the corresponding ethyl 2-oxo-1-benzyl-cyclohexane propionate is prepared. This compound is heated with aqueous sodium hydroxide solution. After cooling the reaction mixture is acidified with hydrochloric acid and extracted with ether. The ethereal extracts are washed with water and dried over sodium sulfate. After evaporation of the solvent the residue is treated as described in Example 2 to obtain 2-oxo-1-benzyl-cyclohexane propionic acid. This product, treated with sodium hydroxide, gives the water soluble sodium salt.

Example 4

161 g. of 2-oxo-1-benzyl-cyclohexane propionic acid dissolved in 620 cc. of sodium hydroxide N are treated, with stirring, at 40° C., with 68 g. of $CaCl_2 \cdot 6H_2O$. The resulting precipitate is filtered, washed with water and dried at 55° C. to obtain 107 g. of calcium salt of 2-oxo-1-benzyl-cyclohexane propionic acid.

Example 5

A solution of 16.6 g. of acrylonitrile in 20 cc. of anhydrous dioxane is added, with stirring, to a mixture of 36.25 g. of α-benzyl-cyclopentanone and 8 cc. of 40% methanolic benzyltrimethylammonium hydroxide solution in 200 cc. of dioxane.

By following the method described in Example 1, the 2-oxo-1-benzyl-cyclopentane propionic acid is obtained. M.P. 74–76° C.

Example 6

A mixture of 2.2 g. of 2-oxo-1-phenyl-cyclopentane acetic acid, 40 cc. of water and 0.42 g. of sodium hydroxide, is treated, drop by drop, at room temperature with a solution of 0.2 g. of sodium borohydride in 20 cc. of water. The temperature is maintained at 55–60° C. during a period of 5 hours after which it is acidified and extracted with ether. The ethereal extracts are collected and evaporated. The oily residue is taken up with 5% sodium bicarbonate. After filtration and extraction with ether the aqueous phase is acidified with hydrochloric acid and the oily precipitate is taken up several times with ligroin until complete crystallization to obtain the 2-hydroxy-1-phenyl-cyclopentane acetic acid; M.P. 97–98° C.

The 2-oxo-1-phenyl-cyclopentane acetic acid, which was used as the starting material in this example, was prepared as follows:

A mixture of 25 g. of 2-phenyl cyclopentanone in 35 cc. of anhydrous ether and 16 cc. of anhydrous benzene is quickly dropped into a suspension of 6.5 g. of sodamide in 85 cc. of anhydrous ether and the resulting mixture is heated under reflux until the evolution of ammonia ceases.

35 g. of ethyl bromoacetate in 40 cc. of anhydrous ether are added, drop by drop, into the mixture which is heated under reflux for 3 hours, poured into water and extracted with ether. The ethereal extracts are dried and evaporated to obtain a residue which is distilled. The fraction passing over at 127–130° C./0.1 mm. Hg gives ethyl 2-oxo-1-phenyl-cyclopentane acetate.

A solution of 1 g. of ethyl 2-oxo-1-phenyl-cyclopentane acetate in 25 cc. of 25% sodium hydroxide is heated under reflux for 4 hours. Then the mixture is acidified with hydrochloric acid, extracted with benzene, dried and filtered. The oily residue is evaporated then it is distilled under vacuum and the fraction which passes over at 150° C./0.1 mm. Hg gives the raw 2-oxo-1-phenyl-cyclopentane acetic acid. After extraction with anhydrous ethyl ether, filtration and crystallization from benzene and ligroin the pure acid is obtained: M.P. 81–83° C.

Example 7

In the same manner as described in the preceding examples the following 1-substituted cycloalkane-alkanoic acids are prepared:

M.P., ° C.
2-oxo-1-p(-chlorobenzyl)-cyclohexane propionic acid _____ 103–105
2-oxo-1-(o-chlorobenzyl)-cyclohexane isobutyric acid _____ 106–108
2-oxo-1-(o-methoxy-benzyl) - cyclopentane propionic acid _____ 83–84
2 - oxo - 1-(o-chlorobenzyl) - cyclopentane propionic acid _____ 99–101
2-oxo-1-(p - chlorobenzyl) - cyclopentane propionic acid _____ 85–87
2-hydroxy-1-(o-methoxy - benzyl)-cyclopentane propionic acid _____ 163–164
2-hydroxy-1-(o - chlorobenzyl) - cyclopentane propionic acid _____ 131–132

Example 8

Pharmacological testing.—The choleretic acivity of the compounds of this invention was evaluated utilizing the biliary fistula essay on male rats weighing about 300 g. A cannula was inserted into the ductus choledochus of the animals subjected to fasting from the evening preceding the observation (water ad libitum) and under urethan narcosis (1.5 g./kg.).

After determining the basal flow, the choleretic agent was administered orally in aqueous solution at the dose of 100 mg./kg. The biliary flow was measured every hour for six hours after the administration of the compound and expressed as variation percent with respect to the basal flow taken as 100.

The results reported in the table show the choleretic action of some of the more representative compounds of the invention in comparison with dehydrocholic acid.

TABLE 1

|  | Hours | | | | | |
|---|---|---|---|---|---|---|
|  | 1 | 2 | 3 | 4 | 5 | 6 |
| Dehydrocholic acid | 169 | 145 | 130 | 115 | 110 | 105 |
| 2-oxo-1-benzyl-cyclohexane propionic acid | 253 | 220 | 174 | 154 | 142 | 119 |
| Sodium salt of 2-oxo-1-benzyl-cyclohexane propionic acid | 255 | 225 | 180 | 160 | 140 | 125 |
| Diethylamine salt of 2-oxo-1-benzyl-cyclohexane propionic acid | 240 | 200 | 190 | 180 | 160 | 150 |
| Diethylamine salt of 2-oxo-1-(o-methoxy-benzyl)-cyclohexane propionic acid | 218 | 206 | 211 | 165 | 149 | 127 |
| Diethylamine salt of 2-oxo-1-(o-chlorobenzyl)-cyclohexane propionic acid | 230 | 169 | 130 | 123 | 123 | 107 |
| Sodium salt of 2-hydroxy-1-phenyl-cyclohexane acetic acid | 281 | 218 | 193 | 162 | 156 | 137 |

Example 9

An emulsion for oral administration is prepared from the following types and amounts of ingredients:

G.
Sodium 2-oxo-1-benzyl-cyclohexane propionate ___ 0.3
Liver extract _____ 1.2
Cascara extract _____ 0.8
Rhubarb extract _____ 4
Alcohol _____ 10
Glycerin _____ 10
Methyl p-hydroxy benzoate _____ 0.10
Dextrose _____ 22
Polysorbate 80 _____ 8

Water is added to the mixture up to a volume of 100 cc., thus obtaining an emulsion.

Example 10

A solution is prepared by dissolving 2.5 g. of 2-oxo-1-benzylcyclohexane propionic acid methyl ester in 100 cc. of ethanol and water. Vitamin $B_{12}$ is then added in an amount of 150 mcg. thus providing a solution suitable for oral administration by drops for therapeutic purposes.

Example 11

Tablets containing 30 mg. each of active compound are prepared by mixing the appropriate quantity of 2-oxo- 1-benzyl-cyclohexane propionic acid with lubricants such as calcium stearate or magnesium sucrose to form a homogenized mixture which is then compressed into tablets.

Example 12

Capsules for oral administration are prepared by filling into gelatin capsules 50 mg. of 2-oxo-1-benzyl-cyclohexane propionic acid or its calcium salt. The active compound can be mixed with diluents such as, for example, powdered lactose, powdered sucrose and the mixture filled into soft gelatin capsules.

Example 13

Tablets are prepared with the following ingredients: diethylamine salt of 2-oxo-1-benzyl-cyclohexane propionic acid (150 mg.), lactose (100 mg.), calcium carbonate, magnesium stearate and sugar coating. The said ingredients are mixed and granulated and the granules dried and compressed into tablets.

It is understood that the 2-oxo-1-benzyl-cyclohexane propionic acid derivatives used as active ingredients in the foregoing Examples 9–13 may be replaced by any of the cycloalkane 1-substituted alkanoic acid derivatives described in the specification. Thus, compositions suitable for therapeutic purposes are provided employing as active agents 2-oxo-1-(o-methoxy-benzyl)-cyclohexane propionic acid; 2-oxo-1-(o-chlorobenzyl)-cyclohexane propionic acid; 2-hydroxy-1-phenyl-cyclopentane acetic acid or salts or esters thereof as well as the other cycloalkane 1-substituted alkanoic acid derivatives of this invention.

Having described our invention, what we desire to secure by Letters Patent is:

1. A compound selected from the group consisting of a member having the formula:

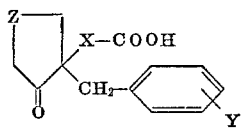

in which Z represents a methylene group or an ethylene group; in which X represents an alkylene group having from 2 to 3 carbon atoms; in which Y represents hydrogen, chlorine, or an alkoxy group having from 1 to 3 carbon atoms;

and salts thereof with medicinally acceptable bases.

2. A compound selected from the group consisting of a member having the formula:

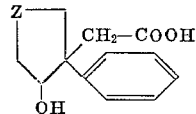

in which Z represents a methylene group or an ethylene group;

and salts thereof with medicinally acceptable bases.

3. A compound selected from the group consisting of a member having the formula:

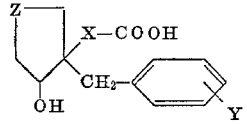

in which Z represents a methylene group or an ethylene group; in which X represents an alkylene group having from 1 to 4 carbon atoms; in which Y represents hydrogen, chloride, fluorine or an alkoxy group having from 1 to 3 carbon atoms;

and salts thereof with medicinally acceptable bases.

4. 2-oxo-1-(o-methoxy-benzyl)-cyclohexane propionic acid.
5. 2-oxo-1-(o-chlorobenzyl)-cyclohexane propionic acid.
6. 2-oxo-1-benzyl-cyclohexane propionic acid.
7. 2-hydroxy-1-phenyl-cyclohexane acetic acid.
8. 2-hydroxy-1-phenyl-cyclopentane acetic acid.
9. The compound of claim 6 in the form of its sodium salt.
10. The compound of claim 6 in the form of its calcium salt.

References Cited

UNITED STATES PATENTS 3,101,346   8/1963   Brown et al. _____ 260—515

OTHER REFERENCES

Arnold et al., Chem Abstracts, vol. 44 (1950), pp. 10696–7.

Ginsburg et al., Chem. Abstracts, vol. 48 (1953), pp. 8796–7.

JAMES A. PATTEN, Primary Examiner

U.S. Cl. X.R.

260—465 F, 469, 473 A, 501.1, 515 R, 515 A, 520